9312X A. Gould
Dyeing Hats

BEST AVAILABLE COPY
Jan. 11, 1836

[illegible]

Aaron Gould of Washington C. of Litchfield St of Connec[ticut]

Letters Patent

The Schedule referred to in these Letters Patent and making pa[rt]
of the same, containing a description in the words of the said Aar[on]
Gould himself, of his improvements in the art of dying hats

---

To all to whom these Presents shall come –
Be it known that I Aaron Gould of Washington in the coun[ty]
of Litchfield and state of Connecticut, have invented a new an[d]
useful improvement in the art of dying and coloring hats and
The following is a full and exact description thereof – Viz:
The hats may be put loose into the liquor or dye without
blocks or the use of a wheel, or may be placed loose in a basket or
crib, and set into the Kettle which may be either round oval or squa[re]
and may be taken from the dye Kettle in the basket or crib as occa-
sion may require for the purpose of airing or otherwise, until the
color becomes perfect, this method without the use of blocks or a
wheel gives a free and even circulation to the coloring matter
through every part of the hat, and produces a bright and per-
manent color without the risk of rubbing the fur off from the hats
or of exposing them to damage in various ways which the former
method of using a block or blocks and wheel often did – October
19th 1835

Witnesses
Perry Smith
Wesley W. Beeman

Aaron Gould

[illegible]